United States Patent
Canelhas (10) Patent No.: US 11,961,183 B2
(45) Date of Patent: Apr. 16, 2024

(54) TERRAIN SEARCH (71) Applicant: Electronic Arts Inc., Redwood City, CA (US)

(72) Inventor: Daniel Ricão Canelhas, Västerås (SE)

(73) Assignee: Electronic Arts Inc., Redwood City, CA (US)

(*) Notice: Subject to any disclaimer, the term of this patent is extended or adjusted under 35 U.S.C. 154(b) by 42 days.

(21) Appl. No.: 17/823,588

(22) Filed: Aug. 31, 2022

(65) Prior Publication Data

US 2024/0070981 A1    Feb. 29, 2024

(51) Int. Cl.
*G06T 17/05* (2011.01)
*G06T 19/20* (2011.01)

(52) U.S. Cl.
CPC .............. *G06T 17/05* (2013.01); *G06T 19/20* (2013.01)

(58) Field of Classification Search
CPC ................................ G06T 17/05; G06T 19/20
See application file for complete search history.

(56) References Cited

U.S. PATENT DOCUMENTS

| | | | | |
|---|---|---|---|---|
| 2003/0085896 A1* | 5/2003 | Freeman | ................. | G06T 15/40 |
| | | | | 345/428 |
| 2005/0264566 A1* | 12/2005 | Sommers | ................ | G06T 17/05 |
| | | | | 345/423 |
| 2015/0262392 A1* | 9/2015 | Park | ...................... | G06T 11/001 |
| | | | | 345/441 |
| 2017/0200301 A1* | 7/2017 | Boissé | .................... | G06T 17/05 |
| 2018/0122135 A1* | 5/2018 | Gain | ....................... | G06T 19/20 |
| 2020/0129862 A1* | 4/2020 | Liu | ........................ | G06T 17/10 |
| 2023/0149812 A1* | 5/2023 | Hooker | ................... | A63F 13/52 |
| | | | | 463/31 |

* cited by examiner

Primary Examiner — Maurice L. McDowell, Jr.
(74) Attorney, Agent, or Firm — Lee & Hayes, P.C.

(57) ABSTRACT

A system may provide for searching terrain data of real-world locations based on input representing a terrain for a game world. The system may receive terrain inquiry data including height data for terrain of a game world, generate an inquiry descriptor based on the terrain inquiry data at least in part by applying a plurality of filters to the terrain inquiry data, the inquiry descriptor including a plurality of inquiry descriptor values corresponding to the plurality of filter and determine, based on the inquiry descriptor and respective sample descriptors of one or more terrain samples corresponding to terrain of real-world locations, one or more matching terrain samples.

20 Claims, 10 Drawing Sheets

TERRAIN SEARCH

BACKGROUND

Video games may feature three-dimensional (3D) terrain. To create terrain for a game world, developers may utilize information about real-world locations. But developers may have desired specifications for the terrain for the game world that lacks a known suitable real-world location to use as an example. When developers are not already aware of a suitable real-world location to meet the desired specifications, determining a suitable real-world location or manually creating the terrain can be a very lengthy and time-consuming process.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Example embodiments of this disclosure describe methods, apparatuses, computer-readable media, and system(s) that may provide for searching terrain data of real-world locations based on input representing a terrain for a game world. In some examples, methods, apparatuses, computer-readable media, and system(s) according to this disclosure may receive height data (e.g., a height field raster image) representing terrain for a game world and search terrain data of real-world locations based on the received height data to determine terrain data of real-world locations that match or are similar to the height data representing the terrain for the game world. The terrain data of matching real-world locations may be utilized in generating in-game terrain.

Some examples may analyze terrain data of a real-world location to generate a descriptor of the terrain data. A descriptor may be an array of numbers (e.g., a vector) where each number corresponds to a feature of the terrain data. Individual numbers of the descriptor may be referred to herein as features or fields of the descriptor. The terrain data may then be made searchable based on the descriptor (e.g., stored in a database using the descriptor as a key).

Some examples may receive a search input representing height data (e.g., a height field raster image) for terrain of a game world. The height data of the search input may be analyzed to generate a descriptor of the height data in a similar manner to that used to generate descriptors of the terrain data of real-world locations. The descriptor of the height data may then be used to search the stored terrain data of the real-world locations (e.g., using the height data descriptor to find database entries with the same or similar descriptors as keys).

In some examples, the disclosed techniques may determine a descriptor of terrain data or search input height data using a set of filters to determine comparisons of average elevation differences (e.g., differences in average heights) in various patterns within the particular terrain data or height data being analyzed. The comparisons may be performed on one or multiple scales. The results of the comparisons may be a series of numbers or binary digits that can be arranged in decreasing order of importance to form the descriptor. The descriptor can be used to score the similarity between the corresponding terrain data or height data and the descriptors of other terrain or height data.

Further, some examples herein may provide for matching that may be tolerant of misalignment between the terrain data being searched and the input data representing the desired terrain of the game world.

The techniques described herein can address technical challenges of creating game world terrain. For example, techniques described herein may allow for identification of real-world locations whose corresponding terrain data may match the specifications for the terrain for the game world and may improve on conventional systems. As mentioned above, game world developers may have desired specifications for the terrain for the game world for which the level designer is not aware of a suitable real-world location for which terrain data (e.g., LIDAR data) may be used. In such a case, the game world developers may either abandon the desired specifications for the terrain for the game world, may have to spend time manually finding a suitable real-world location which has available terrain data, or may have to manually create the terrain or significantly modify existing terrain. These alternatives can result in unacceptably artificial game world terrain or can be very challenging and time consuming.

Certain implementations and embodiments of the disclosure will now be described more fully below with reference to the accompanying figures, in which various aspects are shown. However, the various aspects may be implemented in many different forms and should not be construed as limited to the implementations set forth herein. Moreover, embodiments may vary and are not limited in the computing devices or processors that may perform operations to allow for identification of real-world locations whose corresponding terrain data may match the specifications for the terrain for the game world. It will be appreciated that the disclosure encompasses other variations of the embodiments, as described herein. Like numbers refer to like elements throughout.

Figure 1:
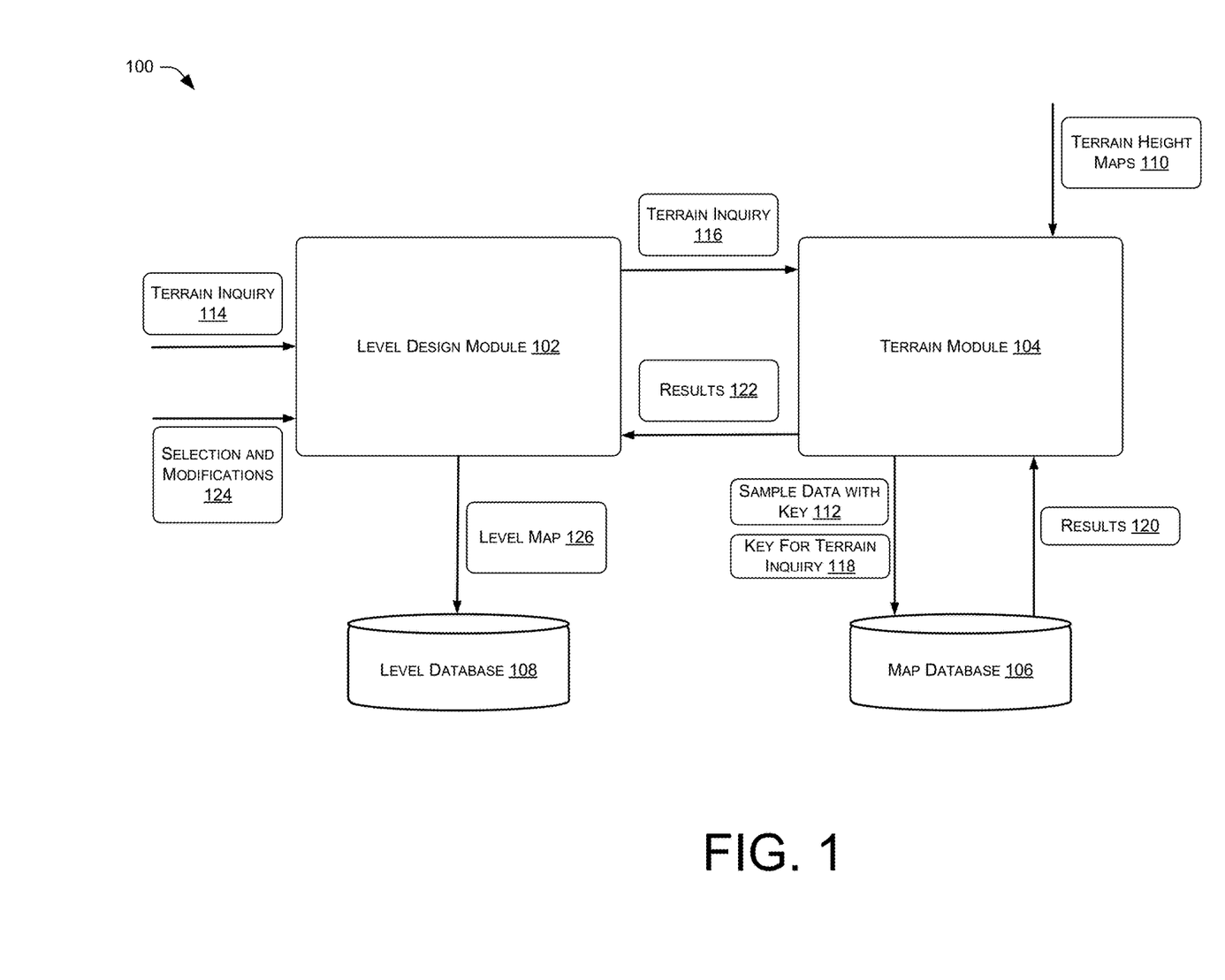
FIG. 1 illustrates a schematic diagram of an example system including a level design module and a terrain module that may operate to allow for identification of real-world locations whose corresponding terrain data may match the specifications for the terrain for the game world and the generation of terrain for the game world based on the terrain data of the matching real-world location, in accordance with examples of the disclosure.

FIG. 1 illustrates a schematic diagram of an example system 100 including a level design module 102 and a terrain module 104 that may operate to allow for identification of real-world locations whose corresponding terrain data may match the specifications for the terrain for a game world and the generation of terrain for the game world based on the terrain data of the matching real-world location. As illustrated, the example system 100 may further include a map database 106 and a level database 108.

Generally, the terrain module 104 may analyze terrain data to generate a descriptor of the terrain data. The terrain module 104 may then utilize the descriptor to store terrain data (e.g., of real-world locations) to the map database 106 using the descriptor as a key to search the stored terrain data.

In operation, the terrain module 104 may receive terrain height maps 110 which may include terrain data of real-world locations. For example, the terrain height maps 110 may be height field raster images (e.g., GeoTIFF, PNG, etc.). While terrain height maps are discussed herein as height field raster images, examples are not so limited. In some examples, the terrain height maps 110 may be received in other formats and converted to height field raster or converted to and/or used in the other formats. For example, the terrain height maps 110 may be received as a list of 3D points in space. The terrain module 104 may convert the 3D point data (e.g., LAS, LAZ) into height field raster data. For example, the terrain module 104 may initialize a grid representing the extent of the area covered by the point data and project each point vertically down into a grid cell. The grid cell may be assigned the height of the projected point. Where multiple points project into a grid cell, the height data may be assigned as the average of the heights of the projected points. After projecting the points to the grid, grid cells without height data may be assigned a default value (e.g., zero (0)) or assigned an average value of the surrounding grid cells. The grid may then be converted into a height field raster image for use in further operations. In another example, the terrain module 104 may convert the point data into a 3D polygon mesh (e.g. using Delaunay triangulation). The terrain module 104 may then assign height values to pixels of a height field raster image based on the height of the 3D polygon mesh at corresponding locations.

In some examples, the terrain height maps 110 can be generated by scanning real world terrain, such as based on Light Detection and Range (LIDAR) data. LIDAR can remotely measure height and density of terrain over large areas. Light can be emitted, reflected off features and objects, such as buildings and tree branches, and the reflected light energy can be retrieved by a LIDAR sensor that records the return signal and other relevant characteristics, such as the signal strength, the time of return, the frequency, and/or the like. This information can be used to generate height data to determine the elevation of features and objects of a terrain. In some examples, the heightfield data can be infrared, ultraviolet, other data indicating height, and/or the like. Further, examples are not limited to the use of LIDAR data and may additionally or alternatively utilize data based on GPS, satellite radar, photogrammetry, a fusion of multiple sources of data and so on.

In some examples, the terrain module 104 may sample the terrain height maps 110 to determine regions that may be analyzed and made searchable in the map database 106.

For example, the terrain module 104 may sample a series of regions of a height field raster image of the terrain height maps 110, potentially with overlap. In a particular example, the terrain module 104 may sample a series of square regions of a height field raster image of the terrain height maps 110 with an overlap of 50% in each direction, such that the samples cover the entire raster image multiple times. In some examples, the terrain module 104 may take samples at rotations 90 degrees apart and/or mirrored (e.g., wherever the combination of rotation and mirroring does not result in a previously sampled configuration). In some examples, the additional sampling may decrease the risk of potential matches being discarded due to misalignment with a terrain inquiry. While discussed herein as sampling regions with overlap, multiple rotations and so on, other examples may not include one or more of these (e.g., if the terrain height map received is already the desired size for a sample to be made searchable).

The terrain module 104 may determine respective descriptors for the samples of the terrain height maps 110. As mentioned above, a descriptor may be an array of numbers (e.g., a vector) where each number corresponds to a feature of the terrain of a sample.

The terrain module 104 may determine a descriptor using a set of filters to determine comparisons of average elevation differences (e.g., differences in average heights) in various patterns within the terrain of a particular sample being analyzed. As mentioned above, the comparisons may be performed on one or multiple scales. The result of the comparisons may be a series of numbers or binary digits that can be arranged in decreasing order of importance to form the descriptor. Descriptors may be compared to score the similarity between the corresponding terrain and the descriptors of other terrain or a terrain inquiry. In some examples, larger scale comparisons may be given higher importance relative to smaller scale comparisons. Further, some examples may convert samples to integral images or summed area tables before applying the filters. Additional details regarding the generation of descriptors are provided below with regard to FIG. 4-7.

The resulting descriptor may be utilized as a key into the map database 106. More particularly, the terrain module 104 may store a sample data with key 112 in the map database 106. Depending on the example, the sample data with key 112 may include the sample image and the descriptor. Additionally, or alternatively, the sample data with key 112 may include a reference to the corresponding terrain height map 110 the sample was taken from (e.g., a filename and/or file location), the location of the sample in the corresponding terrain height map 110, and what rotations and/or mirroring operations were applied to the sample, if any.

In some examples, descriptors may include other information in addition to numbers or binary digits based on the results of applying filters to the height data. For example, descriptor values can include values like a biome of the terrain (e.g., tundra, desert, steppe). Such descriptor values may be utilized to exclude samples that technically match a terrain inquiry but whose usage in level creation may result in an artificial level map (e.g., by using terrain data of a tundra location to generate desert terrain for a game world).

Generally, the level design module 102 may receive search input representing height data (e.g., a height field raster image) for terrain of a game world and operate in conjunction with the terrain module 104 and map database 106 to determine and output matching terrain data. The level design module 102 may receive a selection of a particular matching terrain that can then be modified to generate a final level map for the game world.

In operation, the level design module 102 may receive a terrain inquiry 114. As discussed above, the terrain inquiry 114 may include height data for terrain of a game world, such as a height field raster image. The level design module 102 may output the terrain inquiry 116 to the terrain module 104 for use in determining matching terrain data stored in the map database 106. While terrain inquiries are discussed herein as including height field raster images, examples are not so limited. In some examples, the terrain inquiries may be received in other formats and converted to height field raster images or converted to and/or used in the other formats.

The terrain module 104 may receive the terrain inquiry 116 including height data for terrain of a game world. The terrain module 104 may then generate a descriptor for the height data of the terrain inquiry 116 in a similar manner to that used to generate descriptors of the samples of the terrain height maps 110. The descriptor of the height data of the terrain inquiry 116 may then be as a key for the terrain inquiry 118 to search the map database 106 for stored terrain data of real-world locations (e.g., using the descriptor to find database entries with the same or similar descriptors as keys).

The similarity between the key of the terrain inquiry 118 and the descriptors of the map database 106 may be computed as a weighted distance. As such, descriptors corresponding to similar terrain may have a small distance between them. The weights may be applied such that the difference between the descriptor features of the descriptor with greater scale may have more importance (e.g., greater weight). Features with lower importance or smaller scale features in the vector may be given lower weights (e.g., in proportion to the relative area of the filters used to compute those features). The weighted distance between the descriptors may allow for database entries to be sorted into a partially ordered list containing a ranking of the top-N terrain samples. In some examples, a number of samples returned (N) may be a number of matches requested by a user (e.g., as part of terrain inquiry 114 or as a setting of the terrain module 104).

After determining samples in the map database 106 that have a matching or similar descriptor to the key for the terrain inquiry 118, the map database 106 may output the results 120 to the terrain module 104. The results 120 may include the matching terrain samples and/or information relating thereto. In examples in which images of the samples are not stored in the map database 106, images of the matching terrain samples may be loaded for display to a user. The terrain module may output the results 122 to the level design module 102. The level design module 102 may receive the results 122 and output images of the matching terrain samples for selection by a user.

The level design module 102 may receive a selection and/or modifications 124 of a matching terrain sample. For example, the user may input a selection 124 of a particular terrain sample based on a display of the images of the matching terrain samples. In response, the level design module 102 may generate game world terrain based on the terrain data of the selected terrain sample. For example, the level design module 102 may generate a three-dimensional game world such that a ground height of areas of the game world corresponds to the height field of the corresponding areas of the selected terrain sample. The level design module 102 may provide an interface for the user to input modifications 124 to the three-dimensional game world. This may allow the user to customize or tailor the three-dimensional game world generated based on the selected matching terrain sample.

Figure 2:
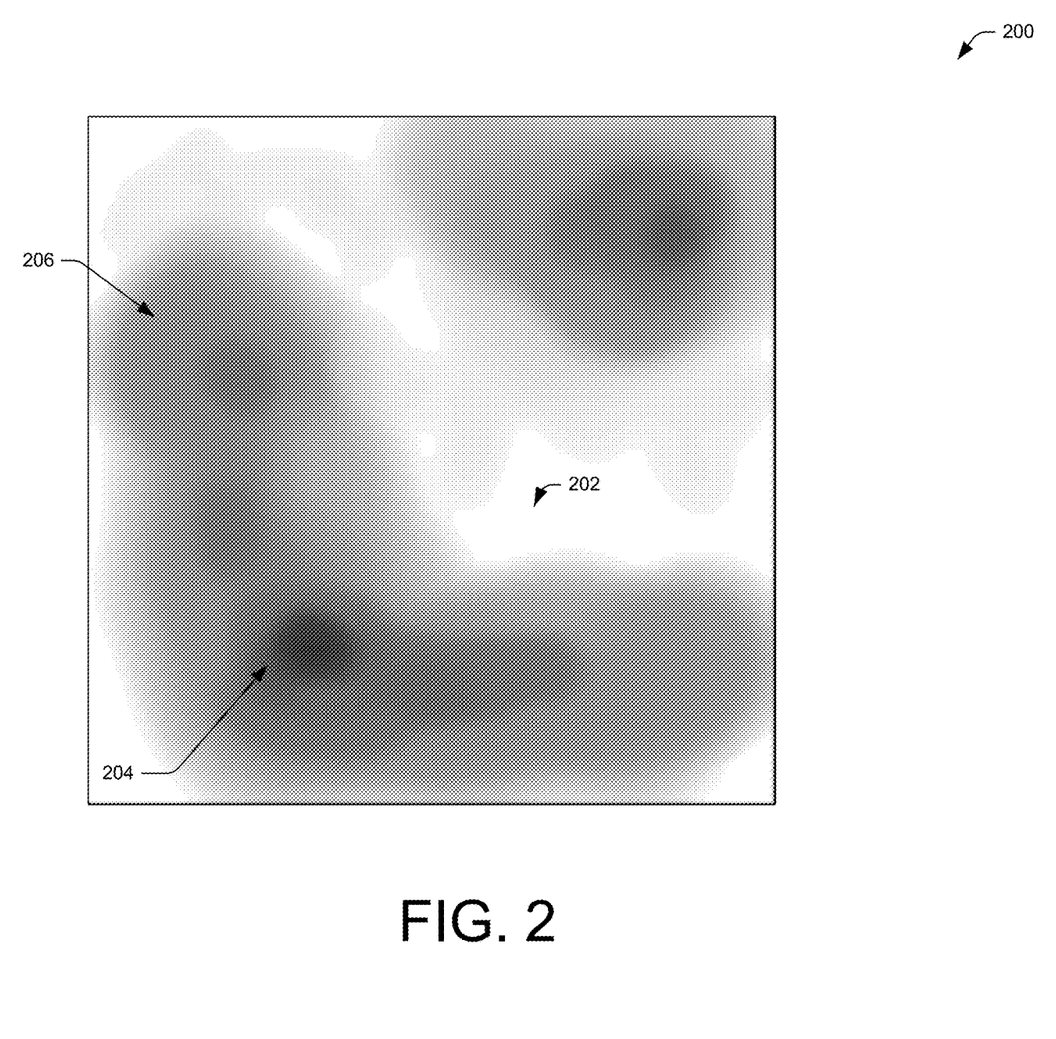
FIG. 2 illustrates an example terrain inquiry that may be input to the level design module to search for a matching terrain sample, in accordance with examples of the disclosure.

FIG. 2 illustrates an example terrain inquiry 200 that may be input to the level design module 102 to search for a matching terrain sample.

In the illustrated example, the terrain inquiry 200 may be a height field raster image. In some examples, the height field raster image 200 may be manually authored by a level designer (e.g., using a raster graphics editor program). For example, individual pixels of the height field raster image 200 may represent corresponding regions of the desired terrain. A value of the pixels may represent the height of the desired terrain in the corresponding region. For example, the value of the pixels located at or around area 202 may represent a zero or lowest height value (e.g., white). Similarly, the value of the pixels located at or around area 204 may represent a highest height value (e.g., black) while the value of the pixels located at or around area 206 may represent a middle height value (e.g., grey).

Figure 3:
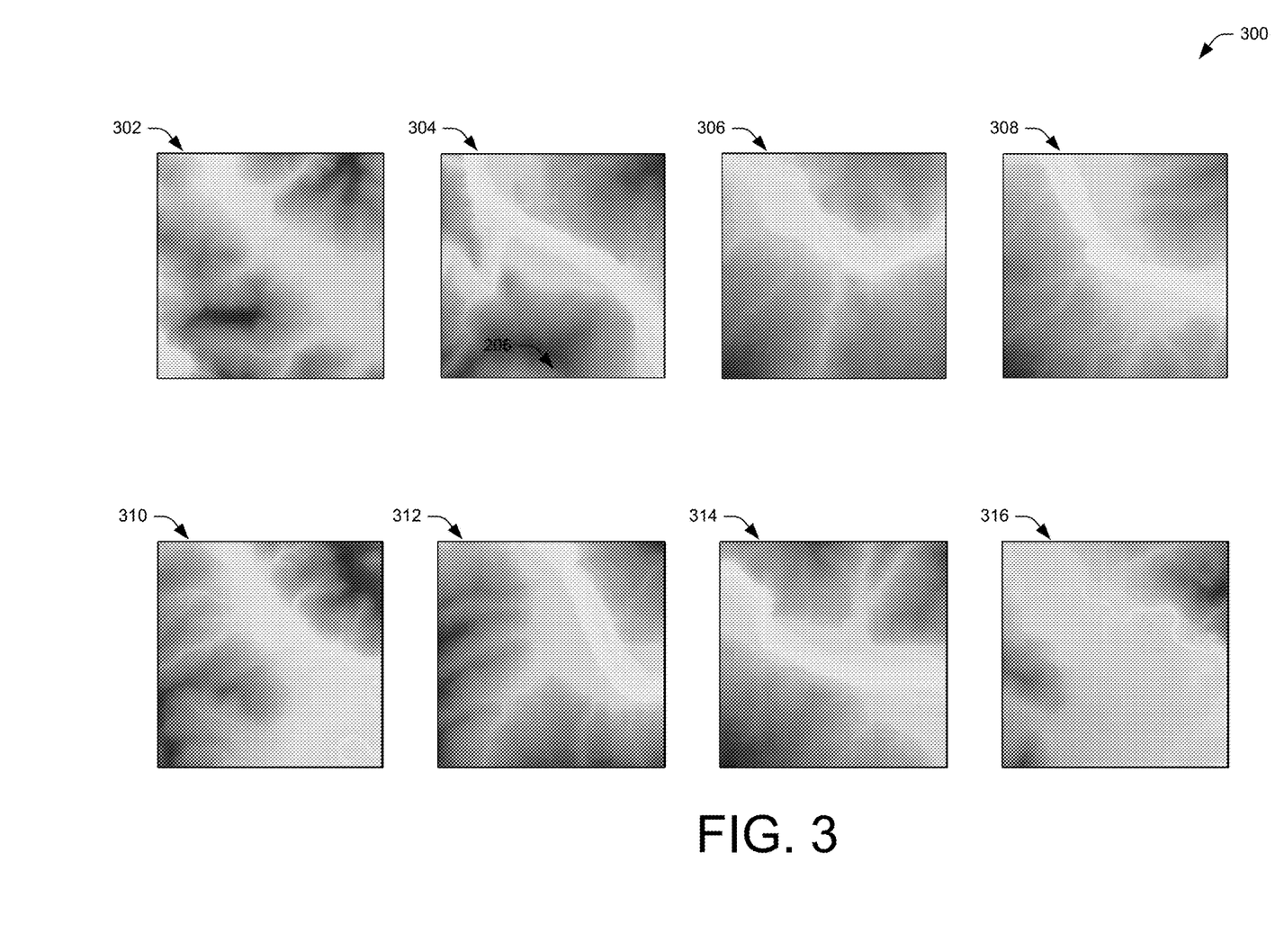
FIG. 3 illustrates example results that may be returned in response to the terrain inquiry of FIG. 2, in accordance with examples of the disclosure.

FIG. 3 illustrates example results 300 that may be returned in response to the terrain inquiry 200 of FIG. 2. More particularly, the terrain module 104 and/or map database 106 of system 100 may receive the terrain inquiry 200 and output images of the terrain samples 302-316.

Figure 4:
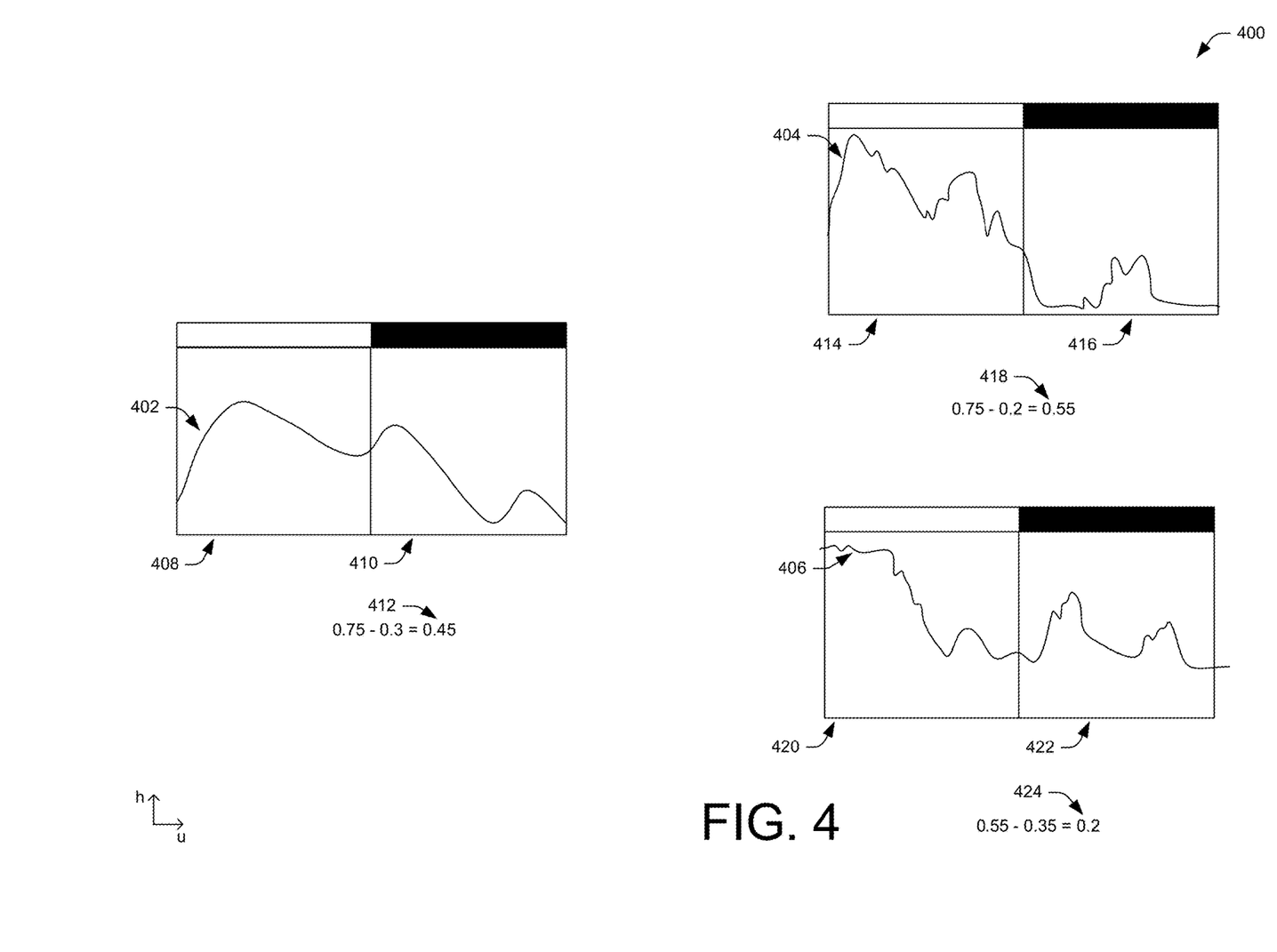
FIG. 4 illustrates an example diagram illustrating the determination of a descriptor feature for two dimensional spaces at a first scale, in accordance with examples of the disclosure.
Figure 5:
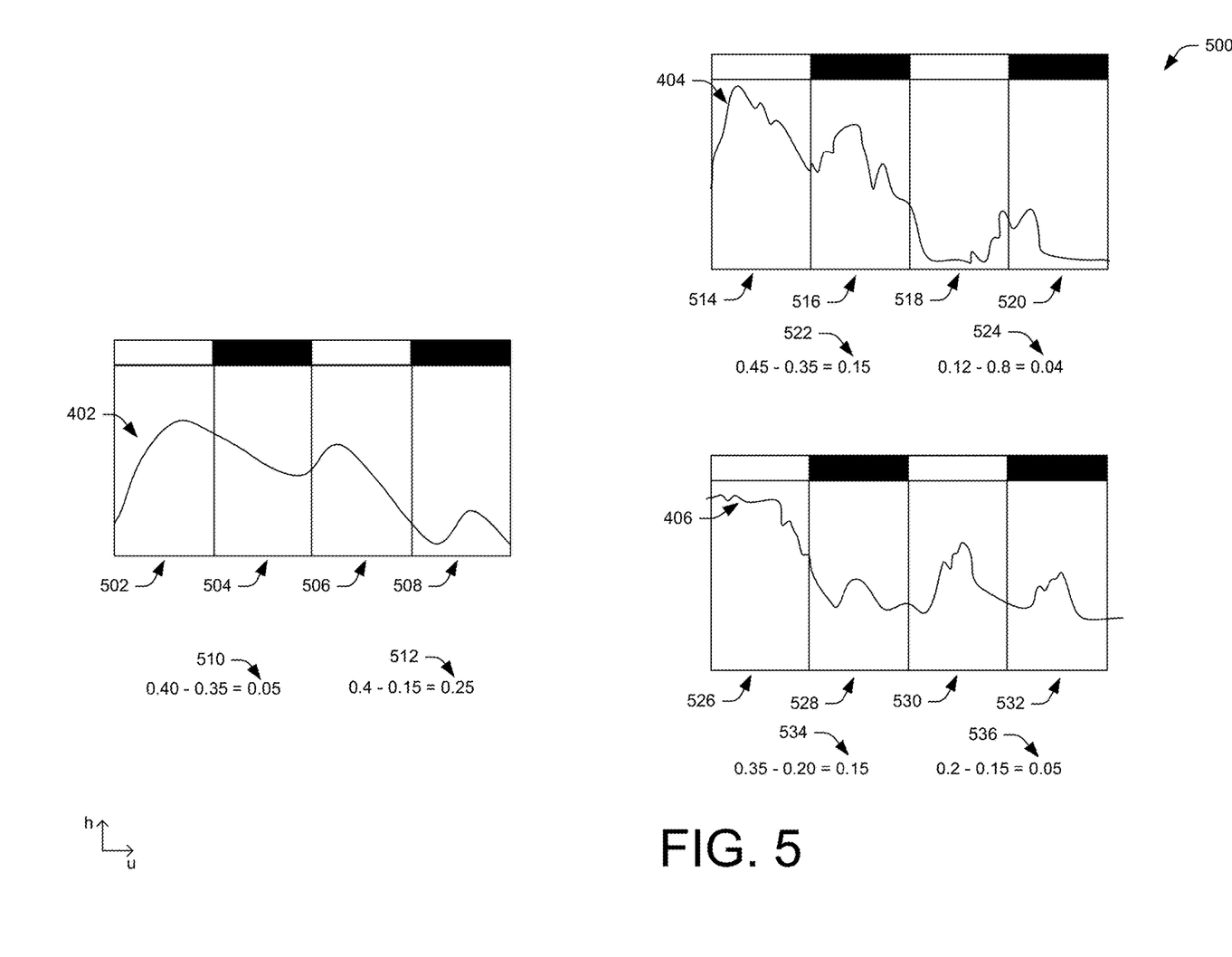
FIG. 5 illustrates an example diagram illustrating the determination of descriptor features for two dimensional spaces at a second scale, in accordance with examples of the disclosure.
Figure 6:
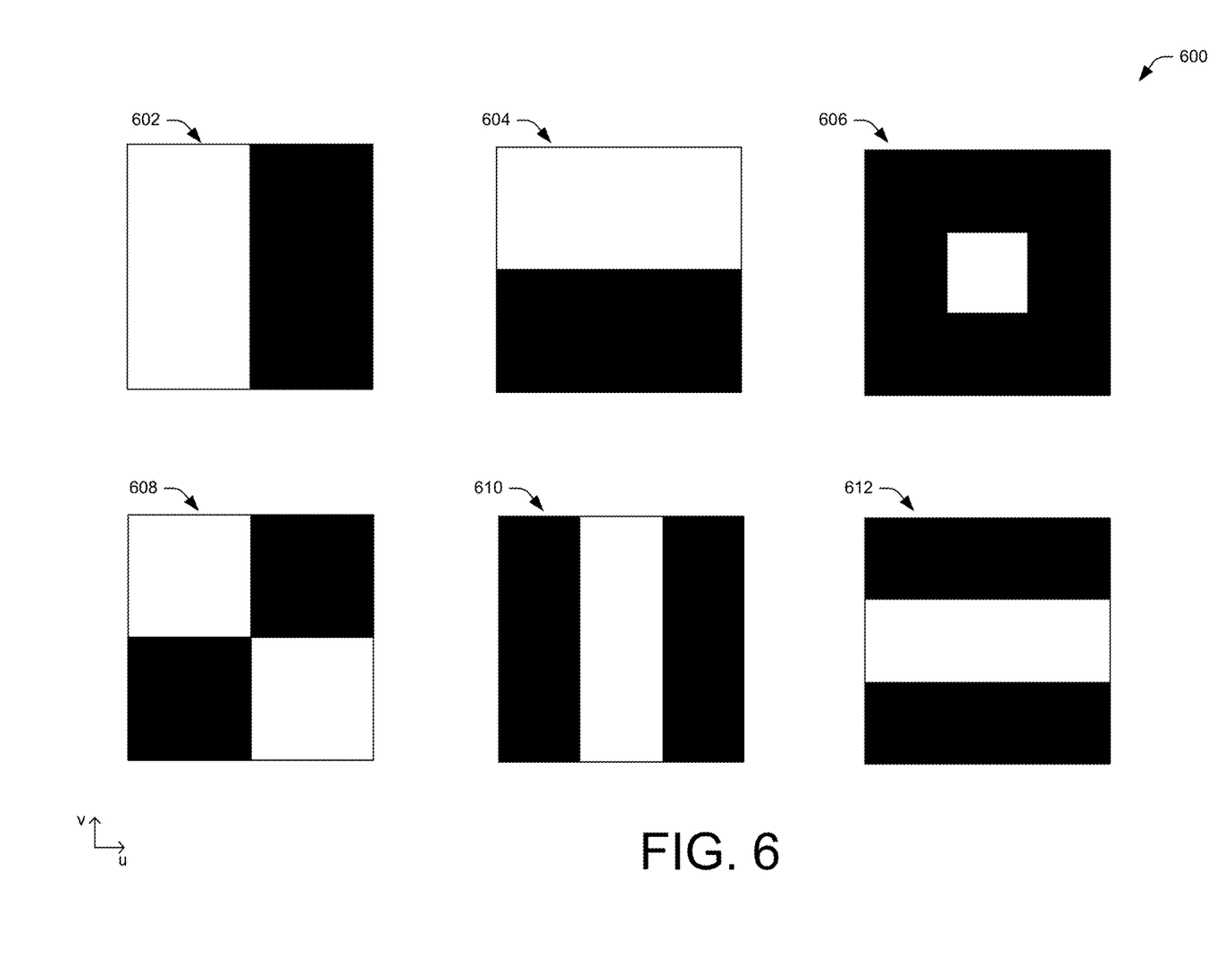
FIG. 6 illustrates an example diagram of filters that may be applied to height field data in three dimensional spaces to determine descriptor features, in accordance with examples of the disclosure.
Figure 7:
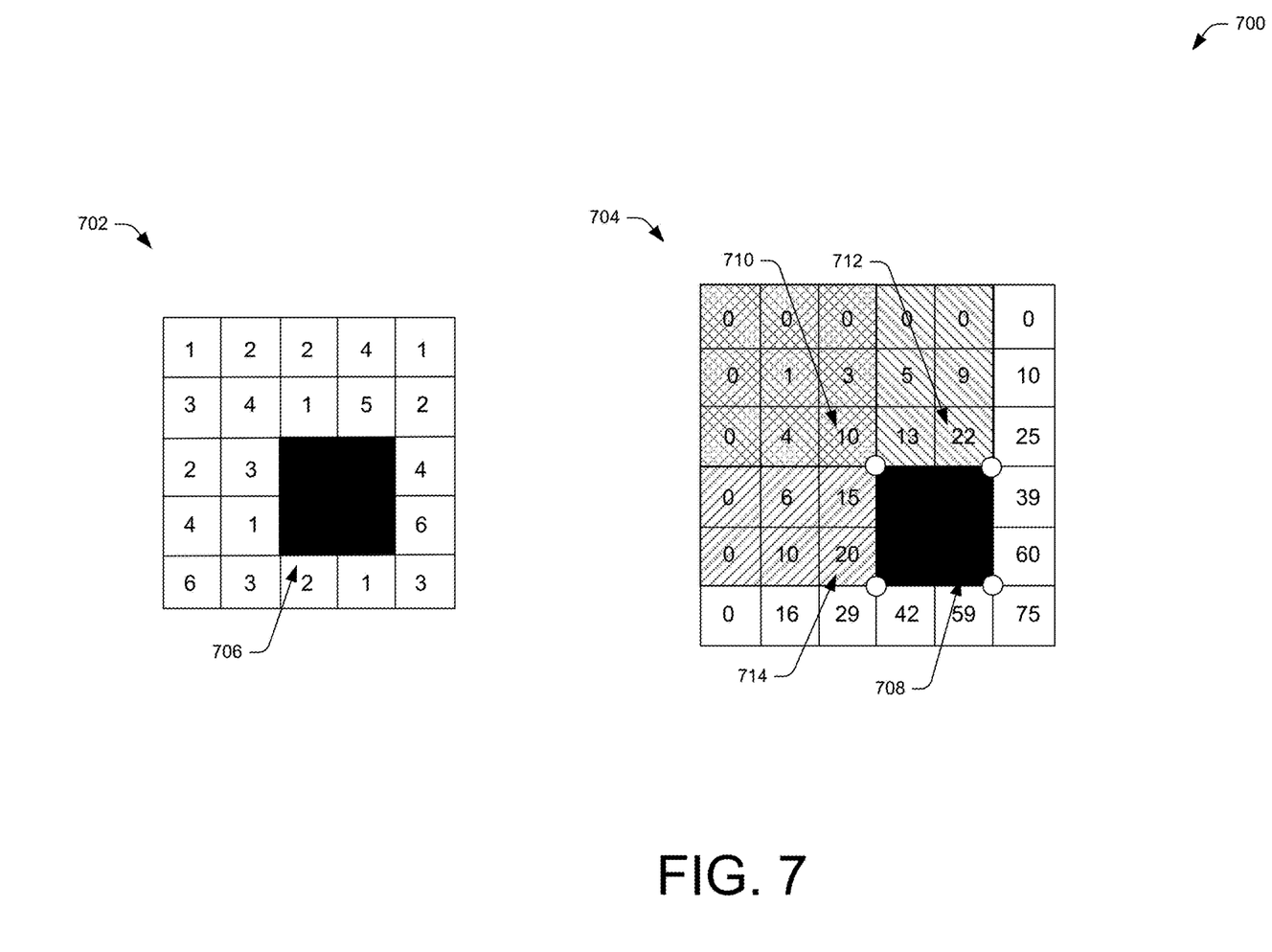
FIG. 7 illustrates an example diagram of a terrain sample and a corresponding integral image, in accordance with examples of the disclosure.

FIGS. 4-7 provide examples of filters which may be applied to height data to determine descriptors thereof. More particularly, FIGS. 4 and 5 illustrate example filters applied to height data of two-dimensional spaces to determine descriptors thereof for comparison. The use of two-dimensional spaces in FIGS. 4-5 is for ease of understanding. FIGS. 6 and 7 relate to extending the filters to three-dimensional spaces.

FIG. 4 illustrates an example diagram 400 illustrating the determination of a descriptor feature for two dimensional spaces at a first scale. More particularly, FIG. 4 illustrates a filter applied to a height data curve generated by the function h=F(u), where h is a height value and u is a horizontal location within the two dimensional space. The filter illustrated in FIG. 4 is based on the sum of the area under the first half of the height data curve (e.g., on the left side) minus the sum of the area under the second half of the height data curve (e.g., on the right side). As illustrated, the filter is applied to a height data curve of a terrain inquiry 402 and the height data curves of two samples 404 and 406. The illustrated filter may result in a descriptor feature that, when positive, may indicate that the left side is more elevated than the right side. In some examples, the result of the filter may be kept (e.g., instead of a binary digit) to allow for understanding of the relative average elevation differences between the halves.

The sum of the area under the first half 408 of the height data curve of the terrain inquiry 402 may be determined to be 0.75, the sum of the area under the second half 410 of the height data curve of the terrain inquiry 402 may be determined to be 0.3, and the difference 412 thereof may be determined to be 0.45.

The sum of the area under the first half 414 of the height data curve of the sample 404 may be determined to be 0.75, the sum of the area under the second half 416 of the height data curve of the sample 404 may be determined to be 0.2, and the difference 418 thereof may be determined to be 0.55.

The sum of the area under the first half 420 of the height data curve of the sample 406 may be determined to be 0.55, the sum of the area under the second half 422 of the height data curve of the sample 406 may be determined to be 0.35, and the difference 424 thereof may be determined to be 0.2.

As such, a first descriptor field value of the descriptors for the height data curves for the terrain inquiry 402 and samples 404 and 406 may be 0.45, 0.55 and 0.2, respectively.

FIG. 5 illustrates an example diagram 500 illustrating the determination of descriptor features for two dimensional spaces at a second scale. More particularly, FIG. 5 illustrates the filter of FIG. 4 applied to a smaller scale. Specifically, the filter of FIG. 5 is applied to each half such that the descriptor values are based on the sum of the area under a first quarter of the half of the height data curve (e.g., on the left side of the half) minus the sum of the area under a second quarter of the half of the height data curve (e.g., on the right side of the half). The illustrated filter may result in a descriptor feature that, when positive, may indicate that the left quarter of the half is more elevated than the right quarter of the half. As illustrated, the filter is applied to each of the left and right halves of the height data curve of the terrain inquiry 402 and the height data curves of the two samples 404 and 406.

The sum of the area under the first quarter 502 of the height data curve of the terrain inquiry 402 may be determined to be 0.40, the sum of the area under the second quarter 504 of the height data curve of the terrain inquiry 402 may be determined to be and the difference 510 thereof may be determined to be 0.05.

The sum of the area under the third quarter 506 of the height data curve of the terrain inquiry 402 may be determined to be 0.40, the sum of the area under the fourth quarter 508 of the height data curve of the terrain inquiry 402 may be determined to be and the difference 512 thereof may be determined to be 0.25.

The sum of the area under the first quarter 514 of the height data curve of the sample 404 may be determined to be 0.45, the sum of the area under the second quarter 516 of the height data curve of the sample 404 may be determined to be 0.35, and the difference 522 thereof may be determined to be 0.15.

The sum of the area under the third quarter 518 of the height data curve of the sample 404 may be determined to be 0.12, the sum of the area under the fourth quarter 520 of the height data curve of the sample 404 may be determined to be 0.08, and the difference 524 thereof may be determined to be 0.04.

The sum of the area under the first quarter 526 of the height data curve of the sample 406 may be determined to be 0.35, the sum of the area under the second quarter 528 of the height data curve of the sample 406 may be determined to be 0.20, and the difference 534 thereof may be determined to be 0.15.

The sum of the area under the third quarter 530 of the height data curve of the sample 406 may be determined to be 0.20, the sum of the area under the fourth quarter 532 of the height data curve of the sample 406 may be determined to be 0.15, and the difference 536 thereof may be determined to be 0.05.

As such, the descriptors for the height data curves for the terrain inquiry 402, sample 404 and sample 406 may be a=[0.45, 0.05, 0.25], b=[0.55, 0.15, 0.04] and c=[0.2, 0.15, 0.05], respectively.

In some examples, scoring the similarity between the terrain inquiry 402 and samples 404 and 406 can be done by computing the squared distance between the descriptor vectors thereof.

The comparison between the descriptor a of the terrain inquiry 402 and the descriptor b of the sample 404 may be determined as:

$$(a-b)*(a-b)^T = 0.06410001$$

Similarly, the comparison between the descriptor a of the terrain inquiry 402 and the descriptor c of the sample 406 may be determined as:

$$(a-c)*(a-c)^T = 0.1125$$

This comparison shows the square distance from a to b to be almost half as large as the distance from a to c. As such, the terrain inquiry 402 may be considered more similar to sample 404.

In some examples, the scoring the similarity between the terrain inquiry and samples may be weighted to consider larger scale descriptor fields as more important than smaller scale descriptor fields. Such a consideration may be added by weighting the squared distance between the descriptor vectors (e.g., relative to the scale). For example, the first field of the descriptor vectors may be given double the weight of the second and third fields of the descriptor vectors because the scale of the first field of the descriptor vectors is double that of the second and third fields.

In such a case, the comparison between the descriptor a of the terrain inquiry 402 and the descriptor b of the sample 404 may be determined as:

$$(a-b)*w*(a-b)^T = 0.0666$$

where w is:

$$w = \begin{bmatrix} 2 & 0 & 0 \\ 0 & 1 & 0 \\ 0 & 0 & 1 \end{bmatrix}$$

Similarly, the comparison between the descriptor a of the terrain inquiry 402 and the descriptor c of the sample 406 may be determined as:

$$(a-c)*w*(a-c)^T = 0.1750$$

The weighted comparison shows the distance is nearly three times as large for the less similar curve (e.g., sample 406), making sample 406 less likely to show up as a suggestion.

FIG. 6 illustrates an example diagram 600 of filters 602-612 that may be applied to height field data in three dimensional spaces to determine descriptor features. More particularly, FIG. 6 illustrates filters that may be applied to height data of a height field raster image or other height data that may be represented by the function h=F(u, v), where h is a height value and u and v are a latitude and a longitude within the three dimensional space, respectively.

When applied to, for example, a height field raster image, the illustrated filters 602-612 may determine the total height of the region of the sample corresponding to the respective white area of the particular filter minus the total height of the region of the sample corresponding to the respective black area of the particular filter.

In some examples, different filters may provide an indication of whether or not a terrain feature is present for the current portion of the sample. For example, filters 602 and 604 may provide an output representing the likely presence of a slope and a slope direction between the black and white areas of the filters. Filter 606 may provide an output representing the likely presence of a peak or crater in the white area of the filter. Filters 608-612 may provide an output representing the likely presence of a valley or ridge in the white or black areas of the filter. Of course, the illustrated filters 602-612 are merely examples and many other filter configurations would be apparent to one of ordinary skill in the art in view of this disclosure.

The descriptor may be stored and used in various manners. For example, the descriptors may be stored including fields with the results of the actual comparisons (e.g., as a positive or negative float number) or as a bit indicating that the difference was negative or positive.

In the case of storing the descriptor fields as a binary value, a convention may be established for when the result of the comparison is zero (e.g., assigning the value of 0 or 1 when the result of the comparison is zero)

In the case of storing real-valued fields for descriptor, the stored values may be the normalized result of the comparison (e.g., divided by the total area). Normalizing the results of the comparison may allow the descriptors to be compared regardless of image resolution of the base terrain data.

In some examples, the number of fields that descriptors may include may be variable. For example, the terrain module may generate longer descriptors, capture more details about the terrain, by repeatedly subdividing the image and applying the filters (e.g., dividing the image into quarters and again after subdividing those quarters into sixteenths and so-on). Descriptors may be compared across as many features as both descriptors have in common.

Further, descriptors fields may be utilized to compare against 90-degree rotations and mirrored versions of the terrain. For example, the descriptor fields may be inverted to compare against mirrored versions of the terrain. In another example, by swapping the descriptor fields corresponding to filters 602 and 604 and inverting the descriptor field for filter 604, the descriptor may be matched with terrain samples that are similar but have mismatched rotation (e.g., a 90-degree mismatch).

Moreover, descriptors may include other information in addition to numbers or binary digits based on the results of applying filters to the height data. For example, descriptor values can include values like a biome of the terrain (e.g., tundra, desert, steppe).

Some implementations may utilize integral images when applying the filters to the terrain inquiry or terrain samples. The utilization of integral images is discussed below with respect to FIG. 7.

FIG. 7 illustrates an example diagram 700 of a terrain sample 702 and a corresponding integral image 704. More particularly, the terrain sample is shown as a height field raster image 702.

In an integral image, the value of each pixel is the summation of the pixels above and to the left of it. As such, the integral image 704 may be padded to the left and the top to allow for the calculation. The pixel value at (2, 1) in the terrain sample 702 may become the pixel value (3, 2) with a value of 4 in the integral image 704 after adding its pixel value (e.g., 3) to the pixel values above it (e.g., 1) and to the left (e.g., 0). Similarly, the pixel at (2,2) in the terrain sample 702 with the value 4 may become the pixel at (3,3) in the integral image 704 with the value 10 after adding its pixel value (e.g., 4) to the pixel values above it (3) and adding the pixels to the left of it (3).

Using an integral image, the total value of subregions of the sample terrain may calculated. For example, in the illustrated example, the summation of the shaded region 706 becomes a calculation using four reference values 708-714 of the rectangular region in the corresponding integral image 704. Specifically, the calculation becomes:

$$47-22-20+10=14$$

More particularly, the calculation may subtract the regions above 712 and to the left 714 of the shaded region. The region 710 may represent the area of overlap and may be added back to compensate for the double subtraction.

Figure 8:
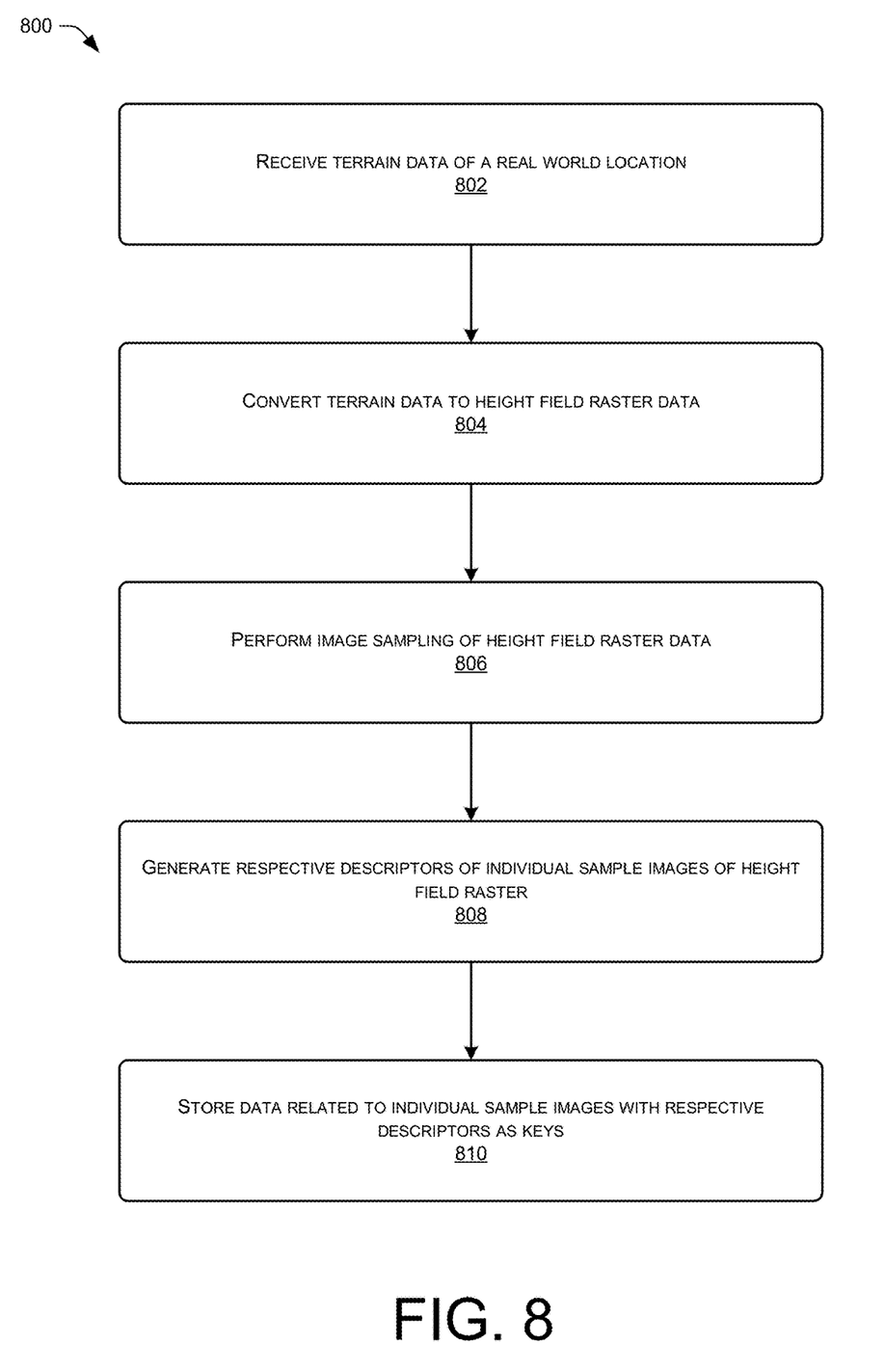
FIG. 8 illustrates a flow diagram of an example method that may be performed by a terrain module to analyze terrain data (e.g., of a real-world location) to generate a descriptor of the terrain data, in accordance with examples of the disclosure.

FIG. 8 illustrates a flow diagram of an example method 800 that may be performed by a terrain module to analyze terrain data (e.g., of a real-world location) to generate a descriptor of the terrain data. The terrain data may then be made searchable based on the descriptor (e.g., stored in a database using the descriptor as a key). The method 800 may be performed by the system 100 as discussed above.

At block 802, the terrain module may receive terrain data of a real-world location. At block 804, the terrain module may convert the received terrain data to height field raster data, if necessary.

Then, at block 806, the terrain module may perform image sampling of the height field raster data. Next, at block 808, the terrain module may generate respective descriptors of individual sample images of height field raster.

At block 810, the terrain module may store data related to individual sample images with respective descriptors as keys.

Blocks 802-810 may be performed as discussed above with respect to FIGS. 1-7.

It should be noted that some of the operations of method 800 may be performed out of the order presented, with additional elements, and/or without some elements. Some of the operations of method 800 may further take place substantially concurrently and, therefore, may conclude in an order different from the order of operations shown above. Further, implementations are not limited to the details of the above examples and variations are possible.

Figure 9:
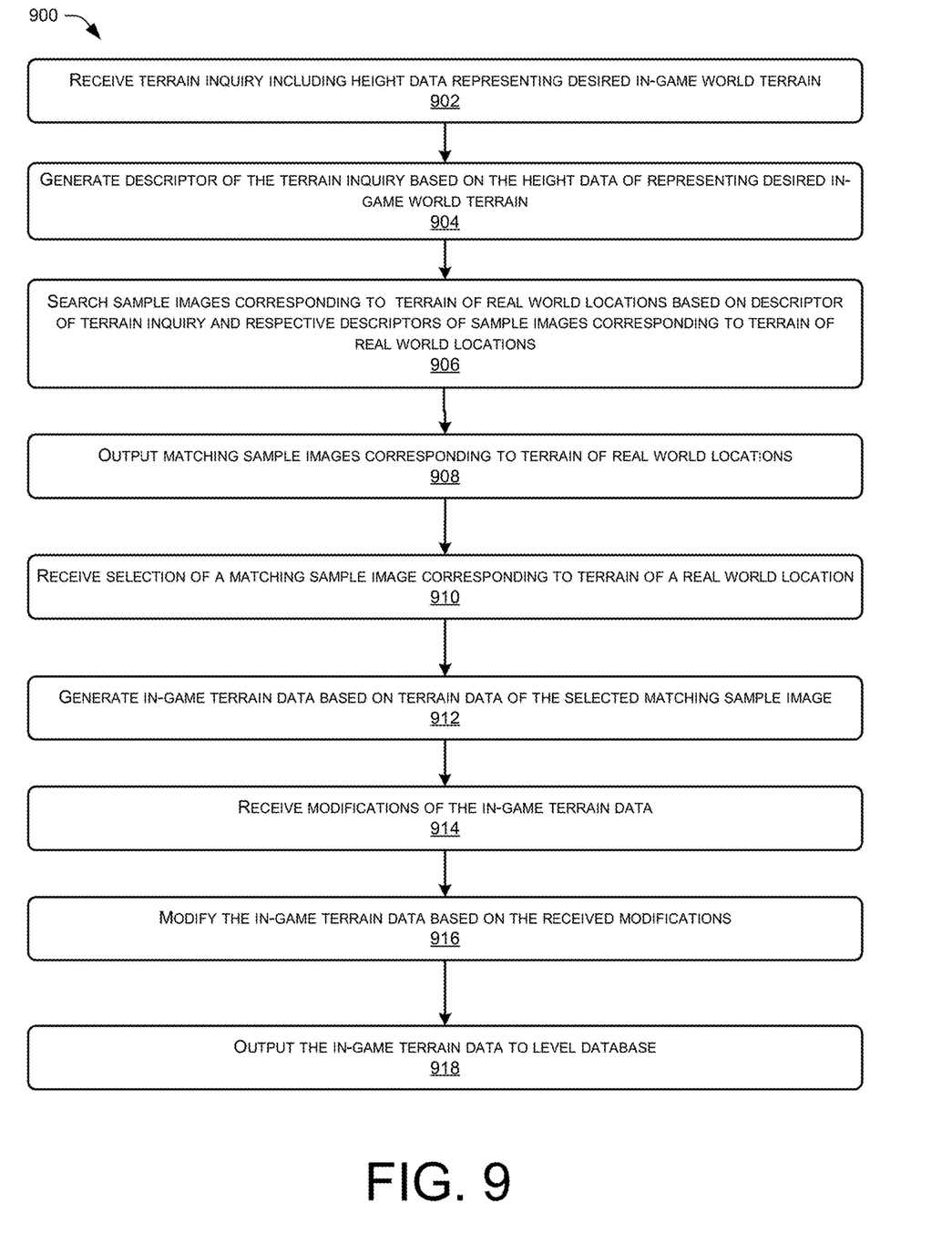
FIG. 9 illustrates a flow diagram of an example method that may receive height data (e.g., a height field raster image) representing terrain for a game world and search terrain data of real-world locations based on the received height data to determine terrain data of real-world locations that match or are similar to the input terrain representing the terrain for the game world, in accordance with examples of the disclosure.

FIG. 9 illustrates a flow diagram of an example method 900 that may receive height data (e.g., a height field raster image) of a terrain inquiry representing terrain for a game world and search terrain data of real-world locations based on the received height data to determine terrain data of real-world locations that match or are similar to the height data of the terrain inquiry representing the terrain for the game world. The matching terrain data of real-world locations may be utilized in generating in-game terrain. The method 900 may be performed by the system 100 as discussed above.

At block 902, the system may receive a terrain inquiry including height data representing desired in-game world terrain. At block 904, the system may generate a descriptor of the terrain inquiry based on the height data of representing the desired in-game world terrain.

At block 906, the system may search sample images corresponding to terrain of real-world locations based on the descriptor of the terrain inquiry and respective descriptors of the sample images corresponding to terrain of real-world locations. Then, at block 908, the system may output matching sample images corresponding to terrain of real-world locations.

The system may then receive a selection of a matching sample image corresponding to terrain of a real-world location at block 910. At block 912, the system may generate in-game terrain data based on terrain data of the selected matching sample image At block 914, the system may receive modifications of the in-game terrain data. At block 916, the system may modify the in-game terrain data based on the received modifications. At block 918, the system may then output the in-game terrain data to the level database.

Blocks 902-918 may be performed as discussed above with respect to FIGS. 1-7.

It should be noted that some of the operations of method 900 may be performed out of the order presented, with additional elements, and/or without some elements. Some of the operations of method 900 may further take place substantially concurrently and, therefore, may conclude in an order different from the order of operations shown above. Further, implementations are not limited to the details of the above examples and variations are possible.

Figure 10:
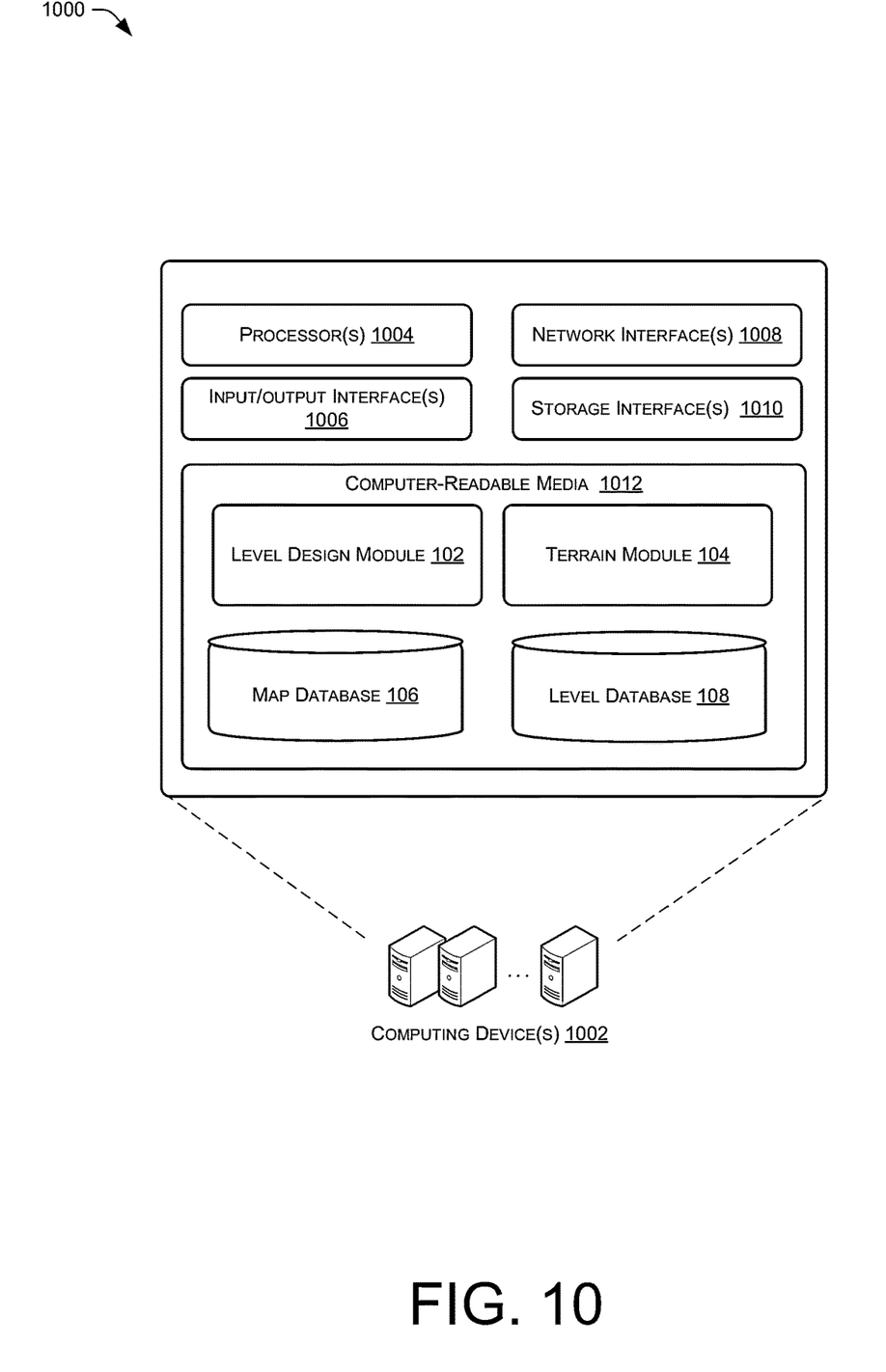
FIG. 10 illustrates a block diagram of an example system including one or more computing device(s) that may operate to allow for identification of real-world locations whose corresponding terrain data may match the specifications for the terrain for the game world and the generation of terrain for the game world based on the terrain data of the matching real-world location, in accordance with examples of the disclosure.

FIG. 10 illustrates a block diagram of an example system 1000 including one or more computing device(s) 1002 that may operate to allow for identification of real-world locations whose corresponding terrain data may match the specifications for the terrain for a game world and the generation of terrain for the game world based on the terrain data of the matching real-world location, in accordance with examples of the disclosure. The computing device(s) 1002 may include one or more processor(s) 1004, one or more input/output (I/O) interface(s) 1006, one or more network interface(s) 1008, one or more storage interface(s) 1010, and computer-readable media 1012.

In some implementations, the processors(s) 1004 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 1004 may possess its own local memory, which also may store program modules, program data, and/or one or more operating system(s). The one or more processor(s) 1004 may include one or more cores.

The one or more input/output (I/O) interface(s) 1006 may enable a user to interact with a user interface module (e.g., to provide input to and receive output from a user application operating on the system 1000). The I/O interface(s) 1006 may include a combination of hardware, software, and/or firmware and may include software drivers for enabling the operation of any variety of I/O device(s) integrated on the system 100 or with which the system 100 interacts, such as displays, microphones, speakers, cameras, switches, and any other variety of sensors, or the like.

The network interface(s) 1008 may enable the system(s) 100 to communicate via the one or more network(s). The network interface(s) 1008 may include a combination of hardware, software, and/or firmware and may include software drivers for enabling any variety of protocol-based communications, and any variety of wireline and/or wireless ports/antennas. For example, the network interface(s) 1008 may comprise one or more of a cellular radio, a wireless (e.g., IEEE 802.1x-based) interface, a Bluetooth® interface, and the like. In some embodiments, the network interface(s) 1008 may include radio frequency (RF) circuitry that allows the system(s) 100 to transition between various standards. The network interface(s) 1008 may further enable the system(s) 100 to communicate over circuit-switch domains and/or packet-switch domains.

The storage interface(s) 1010 may enable the processor(s) 1004 to interface and exchange data with the computer-readable media 1012, as well as any storage device(s) external to the system(s) 100, such as the level design module 102, the terrain module 104, the map database 106, and the level database 108.

The computer-readable media 1012 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 1012 may be implemented as computer-readable storage media (CRSM), which may be any available physical media accessible by the processor(s) 1004 to execute instructions stored on the computer-readable media 1012. In one basic implementation, CRSM may include RAM and Flash memory. In other implementations, CRSM may include, but is not limited to, ROM, EEPROM, or any other tangible medium which can be used to store the desired information and which can be accessed by the processor(s) 1004. The computer-readable media 1012 may have an operating system (OS) and/or a variety of suitable applications stored thereon. The OS, when executed by the processor(s) 1004 may enable management of hardware and/or software resources of the system(s) 100.

Several functional blocks having instruction, data stores, and so forth may be stored within the computer-readable media 1012 and configured to execute on the processor(s) 1004. The computer-readable media 1012 may have stored thereon the level design module 102, the terrain module 104, the map database 106, and the level database 108. It will be appreciated that each of the functional blocks may have instructions stored thereon that when executed by the processor(s) 1004 may enable various functions pertaining to the operations of the system(s) 100.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to examples of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
   one or more processors; and
   one or more computer-readable media storing computer-executable instructions that, when executed by the one or more processors, cause the one or more processors to:
   receive terrain inquiry data including height data for terrain of a game world;
   generate an inquiry descriptor based on the terrain inquiry data at least in part by applying a plurality of filters to the height data, the inquiry descriptor including a plurality of inquiry descriptor values corresponding to the plurality of filters;
   determine, based on the inquiry descriptor and respective sample descriptors of one or more terrain samples corresponding to terrain of real-world locations, one or more matching terrain samples; and
   output sample data of the one or more matching terrain samples.

2. The system of claim 1, wherein the height data for the terrain of the game world of the terrain inquiry data includes a height field raster image.

3. The system of claim 1, wherein the computer-executable instructions further cause the one or more processors to:
   receive a selection of a selected matching terrain sample of the one or more matching terrain samples; and
   generate in-game world terrain data based on the sample data of the selected matching terrain sample.

4. The system of claim 1, wherein:
   a first filter of the plurality of filters includes a first comparison between a height value of a first area of a first portion of the height data and a second height value of a second area of the first portion of the height data, the first area and the second area being determined using a pattern associated with the first filter; and
   a second filter of the plurality of filters includes a second comparison between a third height value of a third area of a second portion of the height data and a fourth height value of a fourth area of the second portion of the height data, the second portion of the height data being a sub-portion of the first portion and the third area and the fourth area being determined using the pattern associated with the first filter.

5. The system of claim 4, wherein the determining of the one or more matching terrain samples includes:
determining, for individual terrain samples of the one or more terrain samples, a weighted distance between a vector of the inquiry descriptor and a vector of a respective sample descriptor of the individual terrain sample, wherein:
the vector of the inquiry descriptor includes the plurality of inquiry descriptor values;
the vector of the respective sample descriptor of the individual terrain sample include sample descriptor values corresponding to the plurality of filters; and
a first weight corresponding to the first filter is greater than a second weight corresponding to the second filter.

6. The system of claim 1, wherein the computer-executable instructions further cause the one or more processors to:
generate the one or more terrain samples corresponding to real world terrain based on real world terrain data;
generate the respective sample descriptors of the one or more terrain samples at least in part by applying the plurality of filters to respective sample data of the one or more terrain samples, the respective sample descriptors including a plurality of sample descriptor values corresponding to the plurality of filters.

7. A computer-implemented method comprising:
receiving terrain inquiry data including height data for terrain of a game world;
generating an inquiry descriptor based on the terrain inquiry data at least in part by applying a plurality of filters to the height data, the inquiry descriptor including a plurality of inquiry descriptor values corresponding to the plurality of filters;
determining, based on the inquiry descriptor and respective sample descriptors of one or more terrain samples corresponding to terrain of real-world locations, one or more matching terrain samples; and
outputting sample data of the one or more matching terrain samples.

8. The computer-implemented method of claim 7, wherein the height data for the terrain of the game world of the terrain inquiry data includes a height field raster image.

9. The computer-implemented method of claim 7, further comprising:
receiving a selection of a selected matching terrain sample of the one or more matching terrain samples; and
generating in-game world terrain data based on the sample data of the selected matching terrain sample.

10. The computer-implemented method of claim 7, wherein:
a first filter of the plurality of filters includes a first comparison between a height value of a first area of a first portion of the height data and a second height value of a second area of the first portion of the height data, the first area and the second area being determined using a pattern associated with the first filter; and
a second filter of the plurality of filters includes a second comparison between a third height value of a third area of a second portion of the height data and a fourth height value of a fourth area of the second portion of the height data, the second portion of the height data being a sub-portion of the first portion and the third area and the fourth area being determined using the pattern associated with the first.

11. The computer-implemented method of claim 10, wherein the determining of the one or more matching terrain samples includes:
determining, for individual terrain samples of the one or more terrain samples, a weighted distance between a vector of the inquiry descriptor and a vector of a respective sample descriptor of the individual terrain sample, wherein:
the vector of the inquiry descriptor includes the plurality of inquiry descriptor values;
the vector of the respective sample descriptor of the individual terrain sample include sample descriptor values corresponding to the plurality of filters; and
a first weight corresponding to the first filter is greater than a second weight corresponding to the second filter.

12. The computer-implemented method of claim 7, further comprising:
generating the one or more terrain samples corresponding to real world terrain based on real world terrain data;
generating the respective sample descriptors of the one or more terrain samples at least in part by applying the plurality of filters to respective sample data of the one or more terrain samples, the respective sample descriptors including a plurality of sample descriptor values corresponding to the plurality of filters.

13. The computer-implemented method of claim 12, further comprising:
storing the respective sample data of the one or more terrain samples in a datastore using the respective sample descriptors as key values.

14. One or more computer-readable media storing computer-executable instructions that, when executed by one or more processors, cause the one or more processors to perform operations comprising: receiving terrain inquiry data including height data for terrain of a game world; generating an inquiry descriptor based on the terrain inquiry data at least in part by applying a plurality of filters to the height data, the inquiry descriptor including a plurality of inquiry descriptor values corresponding to the plurality of filters; determining, based on the inquiry descriptor and respective sample descriptors of one or more terrain samples corresponding to terrain of real-world locations, one or more matching terrain samples; and outputting sample data of the one or more matching terrain samples.

15. The one or more computer-readable media of claim 14, wherein the height data for the terrain of the game world of the terrain inquiry data includes a height field raster image.

16. The one or more computer-readable media of claim 14, the operations further comprising: receiving a selection of a selected matching terrain sample of the one or more matching terrain samples; and generating in-game world terrain data based on the sample data of the selected matching terrain sample.

17. The one or more computer-readable media of claim 14, wherein: a first filter of the plurality of filters includes a first comparison between a height value of a first area of a first portion of the height data and a second height value of a second area of the first portion of the height data, the first area and the second area being determined using a pattern associated with the first filter; and a second filter of the plurality of filters includes a second comparison between a third height value of a third area of a second portion of the height data and a fourth height value of a fourth area of the second portion of the height data, the second portion of the height data being a sub-portion of the first portion and the third area and the fourth area being determined using the pattern associated with the first.

18. The one or more computer-readable media of claim 17, wherein the determining of the one or more matching terrain samples includes: determining, for individual terrain samples of the one or more terrain samples, a weighted distance between a vector of the inquiry descriptor and a vector of a respective sample descriptor of the individual terrain sample, wherein: the vector of the inquiry descriptor includes the plurality of inquiry descriptor values; the vector of the respective sample descriptor of the individual terrain sample include sample descriptor values corresponding to the plurality of filters; and a first weight corresponding to the first filter is greater than a second weight corresponding to the second filter.

19. The one or more computer-readable media of claim 14, the operations further comprising: generating the one or more terrain samples corresponding to real world terrain based on real world terrain data; generating the respective sample descriptors of the one or more terrain samples at least in part by applying the plurality of filters to respective sample data of the one or more terrain samples, the respective sample descriptors including a plurality of sample descriptor values corresponding to the plurality of filters.

20. The one or more computer-readable media of claim 19, the operations further comprising: storing the respective sample data of the one or more terrain samples in a datastore using the respective sample descriptors as key values.

* * * * *